United States Patent
Guillermin et al.

(10) Patent No.: US 7,359,828 B2
(45) Date of Patent: Apr. 15, 2008

(54) PROCESS FOR PLOTTING THE SHAPE OF A CONTOUR OF A PREVIOUSLY MACHINED OPHTHALMIC LENS

(75) Inventors: Laurent Guillermin, Paris (FR); Sylvaine Millet, Soisy sous Montmorency (FR)

(73) Assignee: Essilor International, Charenton le Pont (FR)

( * ) Notice: Subject to any disclaimer, the term of this patent is extended or adjusted under 35 U.S.C. 154(b) by 1176 days.

(21) Appl. No.: 10/411,335

(22) Filed: Apr. 11, 2003

(65) Prior Publication Data

US 2004/0039546 A1 Feb. 26, 2004

(30) Foreign Application Priority Data

Apr. 12, 2002 (FR) .................................. 02 04622

(51) Int. Cl.
*G06F 19/00* (2006.01)
(52) U.S. Cl. ....................................... 702/167; 342/118
(58) Field of Classification Search ................ 702/167, 702/182–185, 188, 150, 179, 153, 181, 187; 342/118, 135, 352, 357.03; 701/207
See application file for complete search history.

(56) References Cited

U.S. PATENT DOCUMENTS 5,717,781 A 2/1998 Ebel et al.

2006/0012802 A1* 1/2006 Shirley ....................... 356/603

FOREIGN PATENT DOCUMENTS

| DE | 38 27 122 | 2/1990 |
|---|---|---|
| DE | 197 27 226 | 10/1998 |
| EP | 1 250 979 | 10/2002 |

* cited by examiner

*Primary Examiner*—Edward Raymond
(74) *Attorney, Agent, or Firm*—Young & Thompson

(57) ABSTRACT

Process for plotting the shape of a contour (5, 6) of a previously machined ophthalmic lens (1), which comprises the steps of:

illuminating an optical face (2, 3) of the lens (1) with a flat light beam (15) to form a linear light spot (16) on this face (2, 3), such that the beam (15) extends beyond said face (2, 3) and illuminates the contour (5, 6);

forming on the optical reception element (18) an image of the light spot (16);

rotating the lens (1) about an axis (A);

scanning the contour (5, 6) with the light beam (15);

plotting concomitantly on the optical reception element (18) the successive positions of at least one single point of this image corresponding to the illuminated point of the contour (5, 6);

deducing the shape of the contour (5, 6).

26 Claims, 3 Drawing Sheets

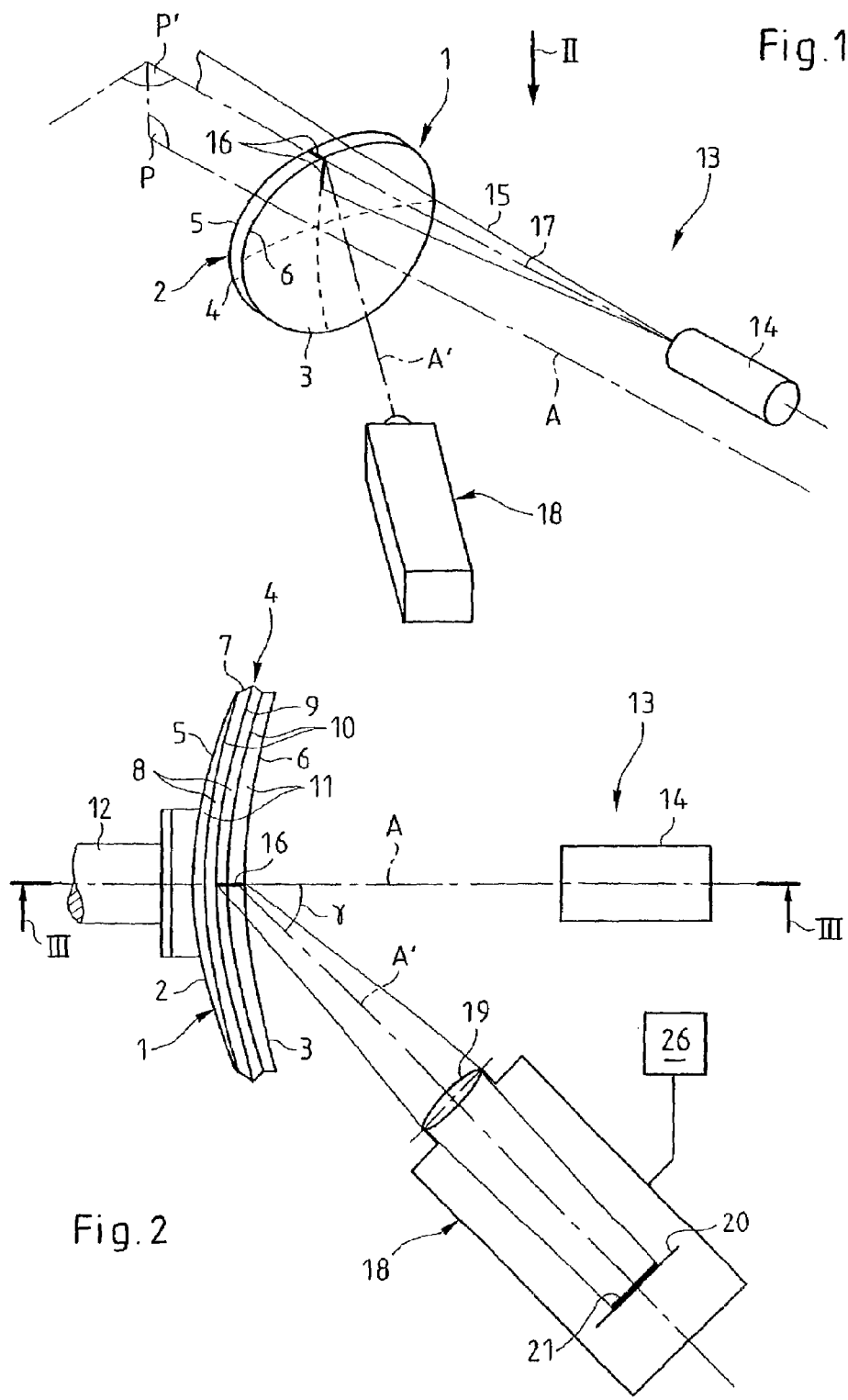

PROCESS FOR PLOTTING THE SHAPE OF A CONTOUR OF A PREVIOUSLY MACHINED OPHTHALMIC LENS

BACKGROUND OF THE INVENTION

1. Field of the Invention

The invention relates to the machining of ophthalmic lenses, i.e. to the set of operations aimed at giving the rim of the lens a predetermined shape corresponding as precisely as possible to that of the ring of a spectacle frame in which the lens is intended to be mounted.

2. Description of the Related Art

It will be recollected that a lens, mounted on a support shaft, subjected firstly to a trueing operation in which it is ground along its rim until the latter has roughly—i.e., generally, with allowance—the predetermined shape, then one or more finishing operations consisting of refining the shape of the rim, and, optionally, giving it a particular structural configuration, for example by machining a bevel or, on the other hand, a groove on the rim.

As soon as these operations have been carried out, the lens is removed from its support shaft to be mounted in the ring of the frame. However, it may then be noticed that the lens is not perfectly matched to said ring, which means that an additional reworking operation is required, which consists of removing again a certain quantity of material from the lens along its rim in order to match the ring of the frame.

Generally, when the lens requires only minor reworkings, such a reworking operation is carried out manually by the optician.

However, such a manual reworking operation involves, for the optician, constant trips between the grinding machine and the frame to check if the lens corresponds to the ring of the frame, which is tedious.

Moreover, such a manual reworking is, by nature, imprecise, and it happens that defects not visible to the naked eye are detrimental to the firm grip of the lens in the ring of the frame.

The imprecision of this manual reworking can also lead to the lens being discarded if it has incorrectable defects.

For this reason, the trend is towards the automation of the reworking to which lenses must be subjected. However, for this automation to be possible, it is necessary to know the shape of the contour which was given to the rim during the machining operations, whether trueing or finishing was involved.

Moreover, the lens can be removed from its support shaft, also, between the trueing operation and the subsequent finishing operation, whether to carry out a first verification of the correspondence between the shape of the lens and that of the ring of the frame or, if necessary, to change the machining device.

In either of the cases which will be presented, removing the lens from its support shaft can cause the loss of the three-dimensional reference mark linked to the lens and used to give the predetermined shape to the rim of the lens during machining.

Solutions have been proposed to preserve this reference mark when the lens is separated from its support shaft.

Thus, certain support shafts have a detachable part at the end, commonly called "gland or holding means" which, positioned and oriented in a precise manner on one of the faces of the lens, is fixed on the latter, generally by means of an adhesive.

Such a "gland or holding means", which has correction means for mounting at the end of the support shaft certainly allows the preservation of the reference mark linked to the lens.

However, the fitting of this "gland or holding means" on the lens requires numerous manipulations such as the definition and the location of a point on the lens for fixing the "gland or holding means". Generally, the fitting of the "gland or holding means" is carried out elsewhere by means of a costly special machine.

BRIEF SUMMARY OF THE INVENTION

The invention aims to resolve in particular the abovementioned drawbacks and to allow a machining of the lens or a reworking of the latter which is both simpler, more reliable and more precise, whilst allowing substantial gains in productivity.

To this end, the invention proposes, according to a first aspect, a process for plotting the shape of a contour of a previously machined ophthalmic lens, which comprises the operations consisting of:

illuminating an optical face of the lens by means of a flat light beam to form a linear light spot on this face such that the beam extends beyond said face and illuminates said contour;

forming on the optical reception means an image of said light spot;

rotating the lens about an axis;

scanning the contour using the light beam;

plotting concomitantly on the optical reception means the successive positions of at least one single point of this image corresponding to the illuminated point of said contour;

deducing the shape of said contour.

It is then possible to proceed to a new automatic, additional, machining operation of the lens. It is sufficient for example to carry out a comparison with the predetermined shape of the contour of the ring of the frame for the lens is intended, to find the machining reference mark.

According to a second aspect, the invention also proposes a device for plotting the shape of a contour of an ophthalmic lens, which comprises:

a light source capable of producing a flat light beam, set up on the one hand to illuminate one face of the lens and forming a linear light spot there, and on the other hand so that the beam extends beyond said face;

optical reception means pointed towards said light spot;

means for rotating the lens about a fixed axis with respect to the light source and the optical reception means;

means for determining the shape of said contour according to successive positions, on the optical reception means, of the image of an illuminated point of the contour.

According to one embodiment, in the plotting operation, the distance to the rotational axis of the corresponding illuminated point of said contour is deduced from the position of said single point on the optical reception means.

Moreover, in the plotting operation, the coordinate of the illuminated point corresponding to that of the contour following the rotational axis can also be deduced from the position on the optical reception means of said single point.

The illuminated face of the lens being delimited by a peripheral edge, the shape of this edge can be plotted in the plotting operation.

The lens having a rim provided with a bevel having a flank bordered externally by a crest and internally by a base, the shape of the crest and/or the shape of the base can be plotted in the plotting operation.

After having plotted the shape of the crest and that of the peripheral edge, the distance of the crest from said edge, parallel to the rotational axis can be deduced therefrom.

The deduction or deductions concerned above are, for example, carried out by means of one or more triangulation calculations.

The device comprises for example a calculator programmed for this purpose which is linked to the optical reception means.

The rotational axis can be chosen parallel to the optical axis of the lens.

Preferably, the light source is separated from the rotational axis by being set up such that said beam and said rotational axis are coplanar.

Moreover, the light source can also be set up such that the bisector of the light beam is approximately parallel to the rotational axis of the lens.

According to one embodiment, the optical reception means have an optical sight axis forming with the bisector of the light beam a constant sight angle, which is not zero, the value of which is for example comprised between 40° and 50°, preferably equal to 45°.

For example, the sight axis and the bisector of the light beam together form a plane perpendicular to the plane of the beam.

Moreover, the light source is preferably set up to produce a coherent light beam. This is for example a laser.

BREIF DESCRIPTION OF THE DRAWING FIGURES

Other characteristics and advantages of the invention will emerge from the following description of one embodiment given by way of a non-limitative example, this description referring to the attached drawings in which:

FIG. 1 is a perspective view of an ophthalmic lens having been subjected to at least one trueing operation, and one face of which is partially illuminated by means of a flat light beam plan extending beyond the face, and forming on this face a linear light spot, optical reception means being moreover pointed towards the light spot for plotting the shape of the edge of the illuminated face;

FIG. 2 is a plan view from above of the lens of FIG. 1, following the direction indicated on this figure by the arrow II, the lens being mounted on a rotary support shaft, the optical reception means being represented schematically and by transparency;

DETAILED DESCRIPTION OF THE PREFERRED EMBODIMENTS

Figure 3:
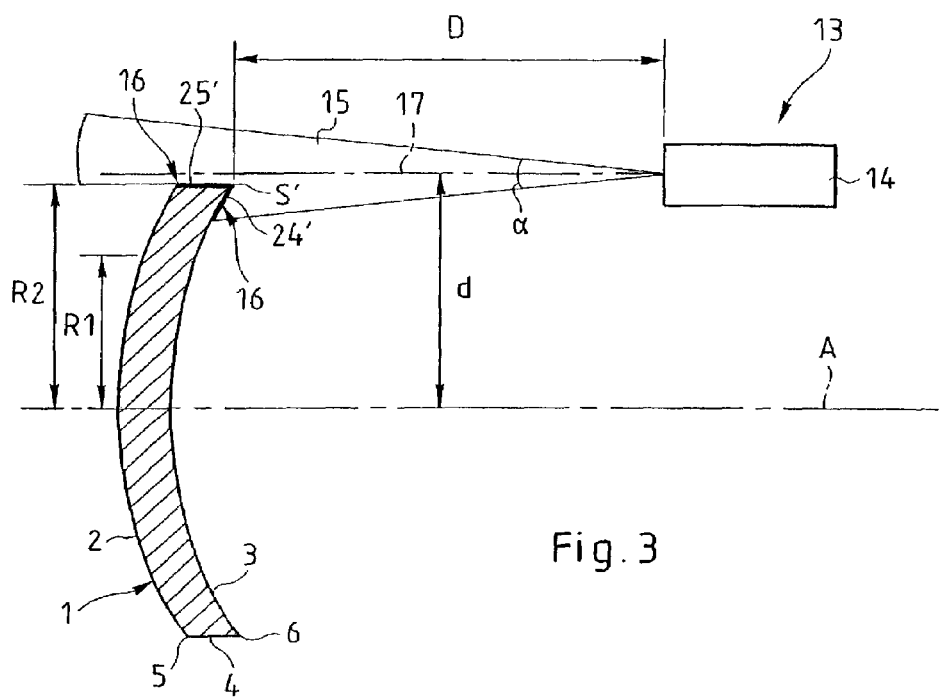
FIG. 3 is a sectional view of the lens of FIGS. 1 and 2, following the cutting plane produced in FIG. 2 by the line III-III, the rim of the lens being cylindrical here.

In FIG. 1 an ophthalmic lens 1 is shown which has two optical surfaces constituted respectively by a so-called front face 2 and a so-called rear face 3 which are opposed, linked by a rim 4 which was initially cylindrical with a circular profile but which, after a machining operation, has a contour approximately corresponding to that of a ring of the spectacle frame in which this lens 1 is intended to be mounted.

The lens 1 has at the junction of its rim 4 and its front face 2 a peripheral front edge 5 which radially delimits the front face 2 and, at the junction of its rim 4 and its rear face 3, a peripheral rear edge 6 which radially delimits the rear face 3.

In a first case, the rim 4 of the lens 1 is cylindrical because it has been subjected to only one trueing operation and must also be subjected to one or more complementary finishing operations.

In a second case, the rim 4 of the lens 1 is also cylindrical, but for a different reason: it has been subjected to one finishing operation after which it has a smooth appearance, currently called a "glass" finish.

These two cases are illustrated in FIG. 3.

Figure 5:
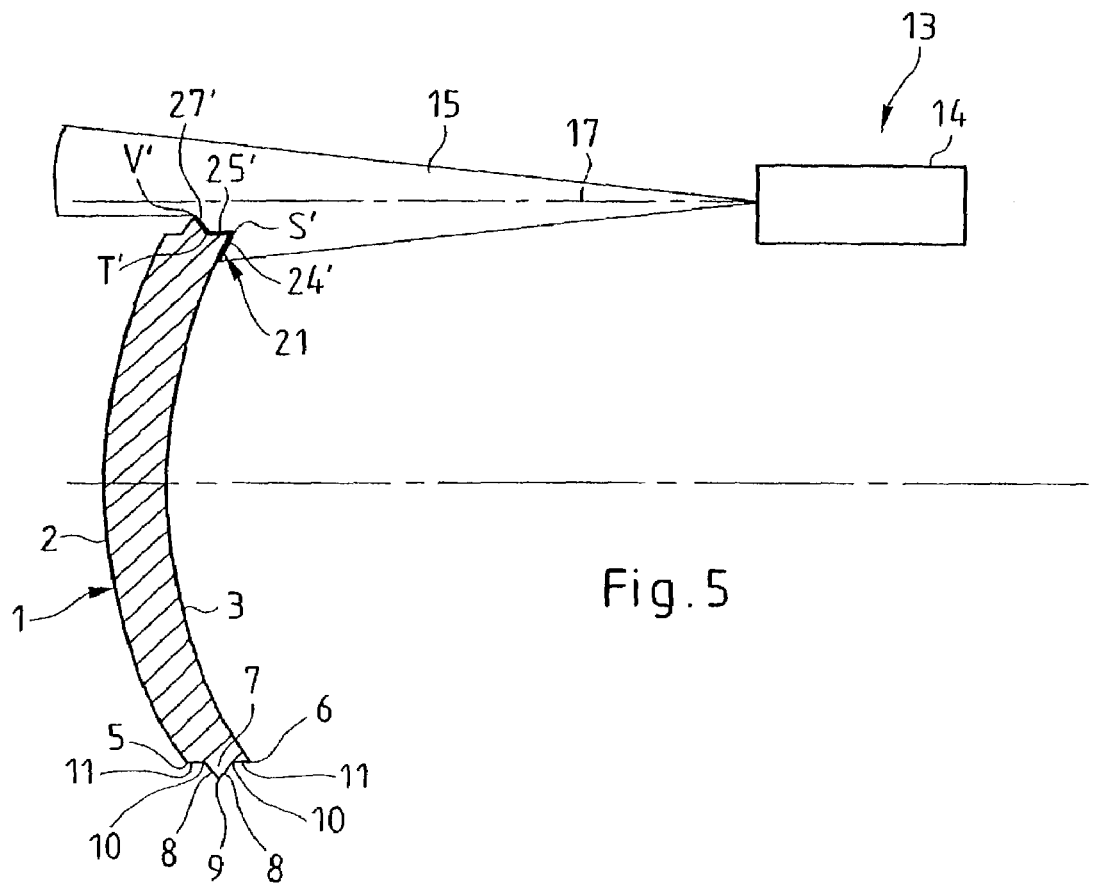
FIG. 5 is a view analogous to FIG. 3 in which the lens has a bevel on its rim.

In a third case, the lens 1 is subjected to one or more particular finishing operations, in this case a bevelling operation, after which the rim 4 of the lens is provided with a radially projecting bevel 7 as shown in FIGS. 2 and 5.

This bevel 7 has two opposite flanks 8, each delimited on the one hand externally by a crest line 9 where the flanks 8 meet, and on the other hand internally by a base 10 which is its junction line with the cylindrical part 11 adjacent to the rim 4.

In the second and third case, the lens 1 must again be subjected to at least one complementary reworking operation, after it has been ascertained that the shape of the rim 4 is not identical to the predetermined shape of the ring of the frame in which the lens I is intended to be mounted.

In these three cases, in order to allow these complementary operations to be carried out automatically, it is desired to plot the shape of at least one contour of the lens 1.

In the first and second case defined above, this contour is constituted by the front edge 5 or the rear edge 6 of the rim 4.

In the third case defined above, it is desired to be able to plot the shape of at least one of the following contours:
the front edge 5 or the rear edge 6,
the crest 9 of bevel 7,
the base 10 of at least one of the flanks 8.

In order to allow the or both plot envisaged, the lens 1 is mounted on a support shaft 12 capable of being rotated about an axis A approximately coincident with the optical axis of the lens 1, although, as will be shown in the following, it is not necessary for these two axes to be exactly coincident, an angular divergence of a few degrees being tolerated.

In FIG. 2, a single support shaft 12 is shown, but the lens 1 can be maintained by gripping between two opposing coaxial support shafts and rotated together about their common axis A.

The or both plot is carried out without contact by means of an optical measuring device 13 comprising a light source 14 arranged opposite one of the faces 2, 3 of the lens 1.

This light source 14 is set up to produce a flat light beam 15 spread inside an angular sector and directed towards the face 2, 3 to form a linear light spot 16 there.

It is indicated that the visibility of this spot 16 results from a diffusion phenomenon on impact of the beam 15 on the lens 1, which phenomenon is produced by the roughness of the surface of the lens 1.

This light source 14 is preferably a laser chosen for its precision, the light beam product then being coherent.

The light source 14 is arranged such that the bisector 17 of the beam is approximately parallel to the rotational axis A of the lens 1, the plane formed together by the bisector and the axis A being called P, and is such that this plane P is coincident with the plane of the beam 15.

Moreover, the light source 14 is set up such that the beam 15 always meets the lens 1, but extending beyond the latter whatever its angular position, in order that the contour whose shape is desired to be plotted is always illuminated.

Preferably, the light source 14 is set up such that the bisector 17 of the beam 15 is located outside the lens 1 whatever the angular position of the latter, in order that the rim 4 is always at least partially illuminated (FIGS. 3 and 5).

In order to satisfy the conditions which have just been stated, in particular the distance d from the light source 14 to the rotational axis A of the lens 1, its distance D to the illuminated face, and the aperture angle ox of the light beam 15 can be modified.

Thus, if it is assumed that the rim 4 of the lens 1 extends between two concentric cylinders centred on the rotational axis A of the lens 1, of respective radii R1 and R2 (with R2>R1), the following conditions will have to be satisfied:

$$d > R2$$

and $$\alpha > 2 \operatorname{Arctan} \frac{R2 - R1}{D}$$

The optical measuring device 13 also comprises optical reception means 18 in the form of a camera provided with an objective lens 19 and a photosensitive screen 20.

Figure 4:
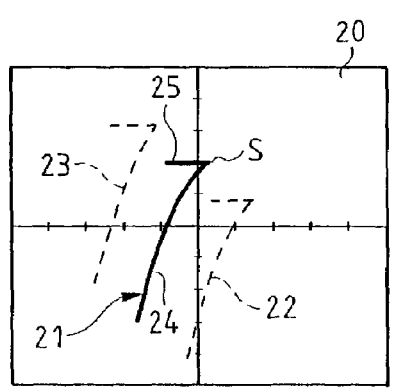
FIG. 4 is a schematic view illustrating the screen of the optical reception means, on which there is shown an image of the light spot formed on the lens of FIG. 3.
Figure 6:
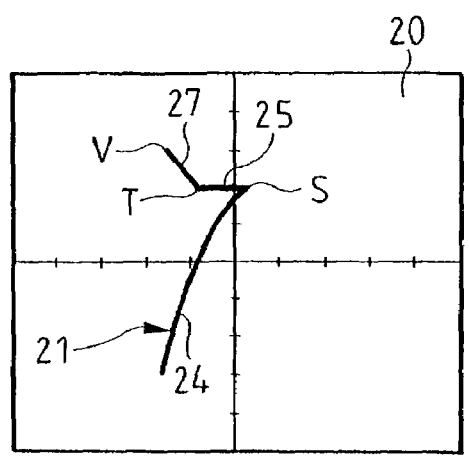
FIG. 6 is a view analogous to FIG. 4, the image appearing on the screen being that of the light spot formed on the lens of FIG. 5.

The camera 18 is pointed towards the light spot 16. More precisely, this camera 18 has a sight axis A', coincident with the optical axis of its objective lens 19 which cuts the light beam 15 on its bisector 17 in the vicinity of the light spot 16 such that it forms a linear image 21 of the latter on the screen 20 (FIGS. 4 and 6).

The camera 18 is oriented on the one hand such that its sight axis A' forms, together with the bisector 17 of the light beam 15 a plane, called P', perpendicular to plan P.

On the other hand it is oriented such that its sight axis A' forms an angle γ with the bisector 17 of the light beam 15, said constant sight angle, not being zero.

The value of this sight angle γ is for example comprised between 40° and 50°. Preferably, the value of the sight angle γ is approximately equal to 45°.

Moreover, according to an embodiment illustrated in FIG. 2, the screen 20 extends in a plane perpendicular to the sight axis A', but it can also be inclined with respect to the latter to form a non-right angle, for example of approximately 45°.

In order to proceed with the plotting of the shape of the chosen contour, the process is as follows.

The lens 1 is rotated about its axis A.

During this rotation, the light spot 16 moves between two limiting return lines the images 22, 23 of which are shown in dotted lines in FIG. 4, the average distance separating these two return lines being called depth of field.

Of course, the size of the screen 20 and the distance from the lens 1 to where the camera 18 is located are chosen according to the depth of field such that the image 21 never leaves the screen 20.

Generally, the depth of field is known in advance so that it is possible to preset the screen 20.

When the lens 1 corresponds to the first or second case given above, the image 21 of the spot 16 shows, in the form of a dotted line having a curved section 24, the image of the intersection 24' of the light beam 15 with the illuminated face 5, 6.

This curved section 24 is extended by a straight section 25 which forms with it an angle and which is the image of the intersection 25' of the light beam 15 with the rim 4 of the lens 1.

The curved section 24 and the straight section 25 meet in a single point S which is the image of the point S' of the illuminated edge 5, 6.

The successive positions of the single point S on the screen 20 are plotted at each moment for each angular position of the lens 1.

Known solutions allow such plotting to be carried out. Thus, the screen 20 can be constituted by a CCD-type matrix optical sensor, the images 21 which then form being the object of a standard numeric treatment.

There is then deduced starting from the successive positions of the single point S on the screen 20:

by a first calculation, the successive distances of the illuminated point 24' of the edge 5, 6 to the rotational axis A and, optionally, by a second calculation, the successive coordinates, following the rotational axis A, of the illuminated point 24' of the edge 5, 6.

These calculations can be carried out by triangulation by means of a calculator 26 programmed for this purpose, with which the device 13 is provided, and which is linked to the optical reception means 18.

The results of the calculation are stored for each angular position of the lens 1 in the calculator 26 such that after a complete revolution of the lens 1, a modelling of the edge 5, 6 is obtained.

The results of the first calculation themselves provide a two-dimensional modelling of the edge 5, 6 corresponding to the projection of the latter on a plane perpendicular to the rotational axis A of the lens 1.

The lens 1 can then be given a glass type finish or can be automatically reworked by grinding its rim 4.

The combination of the results of the two calculations accordingly provide a three-dimensional modelling of the edge 5, 6.

The lens 1 can then be given an worked finish, such as chamfering, bevelling, or also grooving of its rim 4.

When the lens 1 corresponds to the third case given above, the image 21 of the spot 16 is presented in the form of a dotted line having a curved section 24, an image of the intersection 24' of the light beam 15 with the illuminated face 5, 6.

This curved section 24 is extended by a first straight section 25 which forms with it an angle and which is the image of the intersection 25' of the light beam 15 with the cylindrical part 11 of the rim 4 of the lens 1, adjacent to the bevel 7.

This first straight section 25 and the curved section 24 meet in a first single point S which is the image of the point S' of the illuminated edge 5, 6.

The first straight section 25 is extended by a second straight section 27 which forms an angle with it and which is the image of the intersection 27' of the light beam 15 and of the illuminated flank 8 of the bevel 7.

The first straight section 25 and the second straight section 27 meet in a second single point T which is the image of the point T' of the illuminated base 10.

The second straight section 27 ends at a limit point V which is the image of the illuminated point V' of the crest 9 of the bevel 7.

On the image 21 at least one of these points S, T, V, is selected and the calculations given above to deduce the successive positions of this point S, T, V on the screen 20, the distance of the corresponding real point S', T', V' of the lens 1 to its rotational axis A and, optionally, the coordinate of this real point S', T', V' following the rotational axis A are calculated.

As previously described, and according to the selection and the calculations carried out, it is therefore possible to obtain a plot of the two-dimensional shape (i.e. in projection in a plane perpendicular to the rotational axis A of the lens 1) or of the three-dimensional shape:
  of the illuminated edge 5, 6 of the rim 4 of the lens 1, and/or
  of the crest 9 of the bevel 7, and/or
  of the base 10 of the illuminated flank 8 of the bevel 7.

Moreover, by carrying out a systematic comparison between the coordinates of the illuminated point V of the crest 9 or of the base 10 of the flank 8, and of the point S of the illuminated edge 5, 6, the location of the bevel 7 with respect to the illuminated face 2, 3, following the rotational axis A is obtained for all angular positions of the lens 1.

This is useful in particular when it is desired both to rework the shape of the bevel 7 and to chamfer the edge 5, 6.

Once the shape of the contour 5, 6, 9, 10 is stored in the calculator 26, in which the final shape which is desired to be given to said contour 5, 6, 9, 10, has also been stored beforehand, the calculator 26 can carry out a correlation of the two shapes and consequently adapt the machining reference mark which is used to determined the machining instructions.

By "adaptation" is meant on the one hand the centering of the reference mark and the three-dimensional orientation of its axes. This superimposition operation has been described in particular in the International Application No. WO-99/26759 in the name of the Applicant, to which reference can be made.

The invention claimed is:

1. A process for plotting a shape of a contour (5, 6, 9, 10) of a previously machined ophthalmic lens (1), comprising:
  illuminating an optical face (2, 3) of the lens (1) by a flat light beam (15) to form a linear light spot (16) on said face (2, 3) such that the beam (15) extends beyond said face (2, 3) and illuminates said contour (5, 6, 9, 10);
  forming on an optical reception means (18) an image (21) of said light spot (16);
  rotating the lens (1) about an axis (A);
  scanning the contour (5, 6, 9, 10) employing the light beam (15);
  plotting concomitantly on the optical reception means (18) successive positions of at least one single point (S, T, V) of said image (21) corresponding to an illuminated point (S', T', V') of said contour (5, 6, 9, 10); and
  deducing the shape of said contour (5, 6, 9, 10).

2. The process according to claim 1, wherein in the plotting operation, the position of said single point (S, T, V) on the optical reception means (18), a distance to the rotational axis (A), of the corresponding illuminated point (S', T', V') of said contour (5, 6, 9, 10) are deduced.

3. The process according to claim 2, wherein in the plotting operation, the position on the optical reception means (18) of said single point (S, T, V), the coordinate of the corresponding illuminated point (S', T', V') of said contour (5, 6, 9, 10) following the rotational axis (A) are moreover deduced.

4. The process according to claim 1, wherein the illuminated face (2, 3) of the lens (1) being delimited by a peripheral edge (5, 6), a shape of this edge (5, 6), is plotted, in the plotting operation.

5. The process according to claim 3, wherein the lens (1) having a rim (4) provided with a bevel (7) having a flank (8) bounded externally by a crest (9) and internally by a base (10), a shape of the crest (9) is plotted, in the plotting operation.

6. The process according to claim 5, wherein the lens (1) having a rim (4) provided with a bevel (7) having a flank (8) bounded internally by a base (10), a shape of the base (10) is plotted, in the plotting operation.

7. The process according to claim 6, wherein the shape of the crest (9) and the shape of peripheral edge (5, 6), are plotted, in the plotting operation and a distance of the crest (9) to said edge (5, 6), parallel to the rotational axis (A) is deduced.

8. The process according to claim 1, wherein said deduction is carried out using a calculation by triangulation.

9. The process according to claim 1, wherein the rotational axis (A) is chosen parallel to the optical axis of the lens (1).

10. The process according to claim 1, wherein the light beam (15) is separated from the rotational axis (A).

11. The process according to claim 1, wherein said beam (15) and said rotational axis (A) are coplanar.

12. The process according to claim 1, wherein the light beam (15) has a bisector (17) approximately parallel to the rotational axis (A) of the lens (1).

13. The process according to claim 12, wherein the optical reception means (18) has an optical sight axis (A') forming with the bisector (17) of the light beam (15) a constant sight angle ($\gamma$), which is not zero.

14. The process according to claim 13, wherein the value of the sight angle ($\gamma$) is comprised between 40° and 50°, or to 45°.

15. The process according to claim 13, wherein the sight axis (A') and the bisector (17) of the light beam (15) together form a plane (P') perpendicular to plane (P) of the beam (15).

16. The process according to claim 1, wherein said light beam (15) is coherent.

17. The process according to claim 16, wherein said light beam (15) is a laser.

18. A device for plotting a shape of a contour (5, 6, 9, 10) of an ophthalmic lens (1), which comprises:
  a light source (14) capable of producing a flat light beam (15), set up on the one hand to illuminate one face (2, 3) of the lens (1) and forming a linear light spot (16) there, and on another hand so that the beam (15) extends beyond said face (2, 3);
  optical reception means (18) pointed towards said light spot (16);
  means (12) for rotating the lens (1) about a fixed axis (A) with respect to the light source (14) and the optical reception means (18);
  means (26) for determining the shape of said contour (5, 6, 9, 10) according to successive positions, on the optical reception means (18), of an image (S, T, V) of an illuminated point (S', T', V') of the contour (5, 6, 9, 10).

19. The device according to claim 18, wherein the light source (14) is separated from the rotational axis (A) of the lens (1).

20. The device according to claim 18, wherein the light source (14) is set up such that said beam (15) and said rotational axis (A) are coplanar.

21. The device according to one claim 18, wherein the light source (14) is set up such that the bisector (17) of said light beam (15) is approximately parallel to the rotational axis (A) of the lens (1).

22. The device according to claim 21, wherein the optical reception means (18) has an optical sight axis (A') forming with the bisector (17) of the light beam (15) a constant sight angle (γ), which is not zero.

23. The device according to claim 22, wherein the optical reception means (18) are set up such the value of the sight angle (γ) is comprised between 40 and 50°, or to 45°.

24. The device according to claim 22, wherein the light source (14) and the optical reception means (18) are set up such that the sight axis (A') and the bisector (17) of the light beam (15) form together a plane (P') perpendicular to plane (P) of the beam (15).

25. The device according to claim 18, wherein said light source (14) is set up to produce a coherent light beam (15).

26. The device according to claim 25, wherein said light source (14) is a laser.

* * * * *

UNITED STATES PATENT AND TRADEMARK OFFICE
CERTIFICATE OF CORRECTION

PATENT NO. : 7,359,828 B2  Page 1 of 1
APPLICATION NO. : 10/411335
DATED : April 15, 2009
INVENTOR(S) : Guillermin et al.

It is certified that error appears in the above-identified patent and that said Letters Patent is hereby corrected as shown below:

Title page, item (73) Assignee: should read as follows, -- Essilor International (Compagnie Generale D' Optique), Charenton le Pont (FR) --.

Signed and Sealed this

Twenty-fourth Day of November, 2009

David J. Kappos
*Director of the United States Patent and Trademark Office*